UNITED STATES PATENT OFFICE.

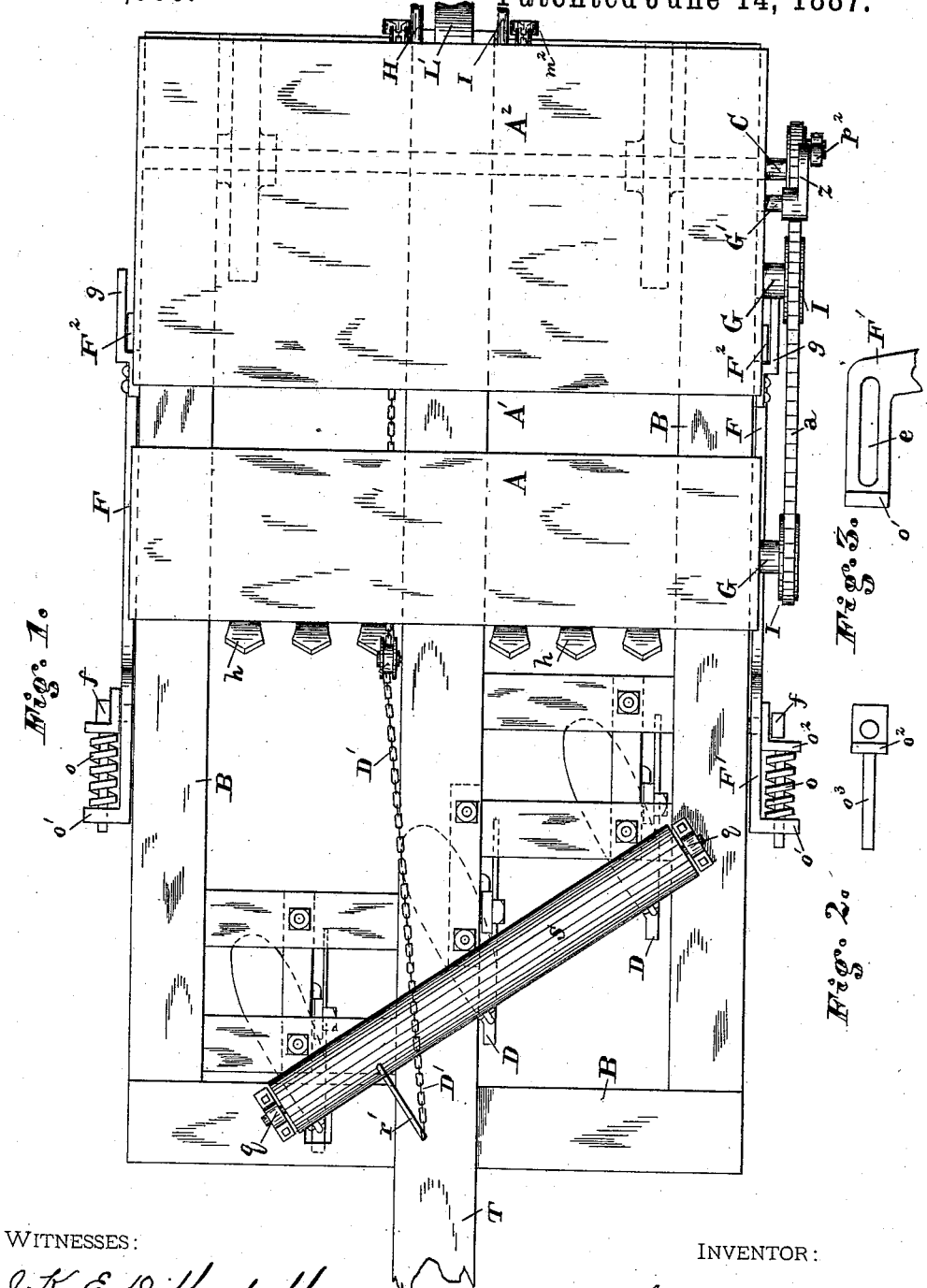

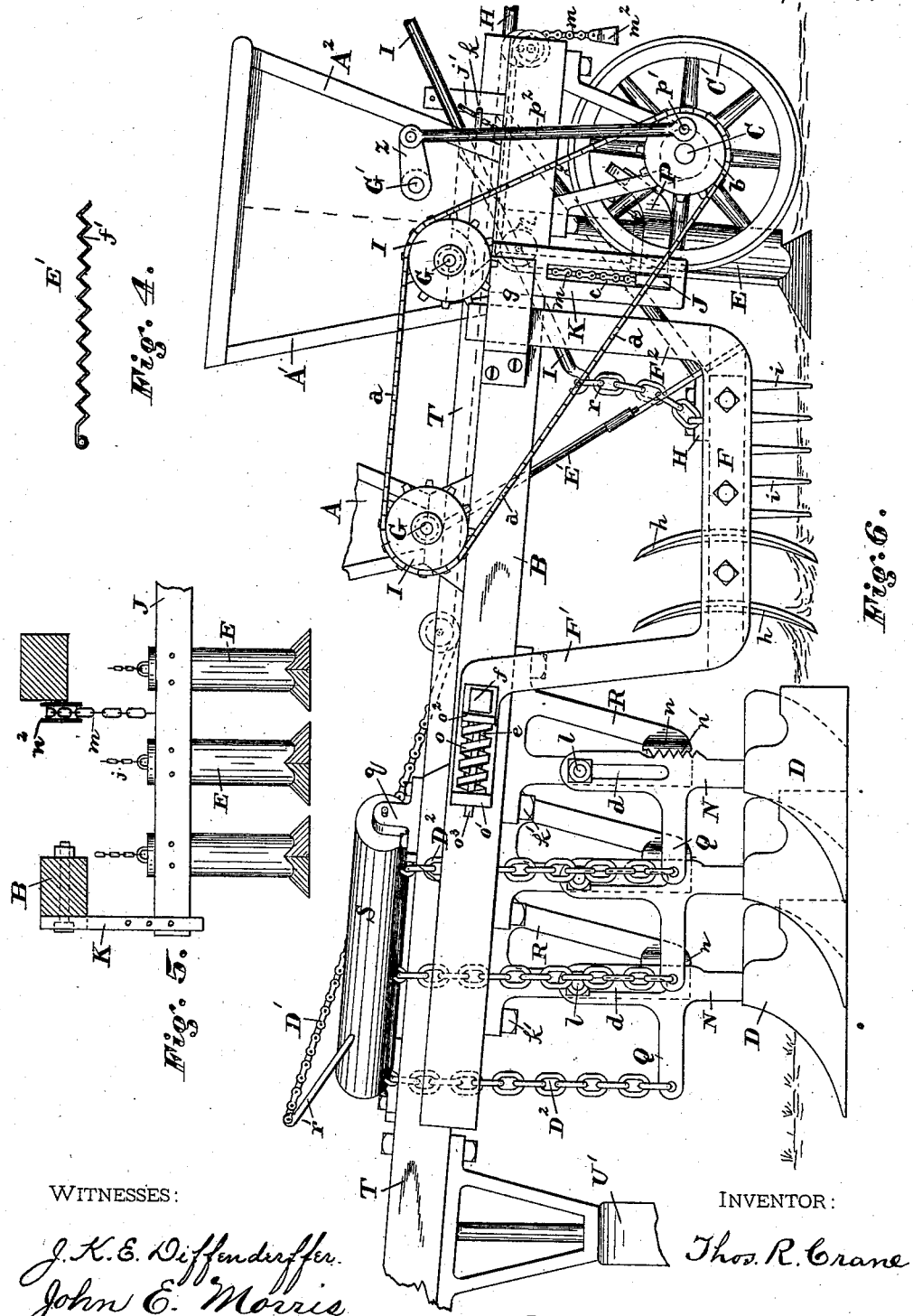

THOMAS R. CRANE, OF HEATHSVILLE, VIRGINIA.

COMBINED PLOW, HARROW, AND PLANTER.

SPECIFICATION forming part of Letters Patent No. 364,906, dated June 14, 1887.

Application filed March 31, 1887. Serial No. 233,224. (No model.)

*To all whom it may concern:*

Be it known that I, THOMAS R. CRANE, a citizen of the United States, residing at Heathsville, in the county of Northumberland and State of Virginia, have invented certain new and useful Improvements in Combined Plow, Harrow, and Planter, of which the following is a specification.

This invention relates to an improved machine comprising in one organization gang-plows, a harrow, a broadcast grass seed sower and fertilizer, and grain-drill.

The invention is illustrated in the accompanying drawings, in which—

Figure 1 is a top view of the machine. Figs. 2 and 3 are details of the harrow-spring. Fig. 5 is a partial cross-section showing the means for vertically elevating all the drill-tubes. Fig. 4 is a cross-section showing the corrugated apron for the broadcast seed-sower. Fig. 6 is a side elevation of the machine.

The letter B designates the frame; C, the axle, and C' two wheels on the axle, serving to support the machine.

Three hoppers are mounted on the machine. The front one, A, is for grass-seed, the middle one, A', for grain, and the rear one, $A^2$, for fertilizer.

The grass seed and grain hoppers have a suitable feed device, the preferred one being that described in my application for Letters Patent of the United States, Serial No. 228,038, filed February 18, 1887. A sprocket-wheel, I, is on the end of each feed-shaft G, and a chain, *a*, passed over the sprocket-wheels, and also over a similar wheel, *b*, on the axle C, serves to impart motion to the said feed devices.

The fertilizer-hopper $A^2$ has a suitable agitator and feed device on a rock-shaft, G', the end of which is seen in Fig. 6. A crank-arm, *z*, is on this shaft, and a rod, $p^2$, connects the said arm with a crank-wheel wrist, *p'*, on the axle sprocket-wheel *b*. As the crank-arm *z* on the agitator-shaft G' is longer than the crank-wrist *p'* is from its axis, the rotation of the latter will cause the former to vibrate.

Drill-tubes E convey the grain and fertilizer from their respective hoppers to the ground. Each drill-tube is separately or independently raised and lowered vertically by a chain, *j*, having at its upper end a ring, *j'*, which, when the tube E is down, rests on a suitable support, *k*, back of the hopper. All the drill-tubes E are attached to a bar, J, which extends horizontally crosswise below the frame, and at each end is supported and vertically guided by a vertical hanger-arm, K, which is rigidly secured to the frame B.

The horizontal crosswise bar J and all the drill-tubes E attached to it may be raised and lowered together vertically. To effect this, the two rigid hanger-arms K—one of which is secured at each side of the frame—are slotted, as at *c*. The slots serve as guides, and the ends of the said bar J occupy the slots *c*. The bar J may therefore be raised and lowered in said slots *c*. A chain, *m*, has one end attached to the crosswise bar J and passes over a pulley, $n^2$, and has at the other end, near the driver's seat, which is supported on brace-bars L', a stirrup, $m^2$. By the driver placing his foot in the said stirrup and bearing down the bar J all the drill-tubes will be raised vertically. This vertical mode of raising the drill-tubes is of special value in this combined machine, because of the limited room on the frame B for each part of the machine. As the vertical movement here shown requires for its action less room than other constructions heretofore used, I am able to effect the organization in one machine of the several parts herein described.

The drill-tubes E are attached to the crosswise bar J by some suitable means, preferably the yielding clamp P, described more fully in my application for Letters Patent of the United States, Serial No. 229,543, filed March 3, 1887.

Several plows, D, are suspended from the frame B and pivoted. Each plow has an upright standard, N, which is provided with a vertical slot, *d*, and a forward-projecting arm, Q. The position of the said arm Q with respect to the slotted standard is such as to form a bell-crank lever. A separate hanger and brace-iron, R, for each plow is secured to the lower side of the frame by bolts *k'*, and has at its upper part a set-screw, *l*, and at its lower part a lug or brace-shoulder, *n*. This brace-shoulder is provided with teeth or serrations $n'$, and the plow-standard N also has similar teeth. Each plow is attached to a hanger, R, by the set-screw $l$, occupying the vertical slot $d$. When the plow is in position for work, as shown in Fig. 6, its standard N rests against the brace-shoulder $n$ on the hanger, and the teeth $n'$ of the two parts engage, and thus the plow may be secured at any desired point of vertical adjustment. A roller, S, above the frame has bearings $q$, and a lever, $r'$, and a chain, D', attached to the lever, serve to partly turn the roller. A separate chain, $D^2$, connects the arm Q of each plow-standard with the roller S. It will be seen that when the chain D' is drawn the roller will be partly turned, whereupon all of the plows will be lifted or swung up.

The harrow comprises two side irons, each of which has a straight horizontal part, F, a front upward-projecting arm, F', and a rear upward-projecting arm, $F^2$. Suitable cross-beams connect the said iron at one side of the machine with the iron at the other side, and these beams have prongs or teeth $h\ i$. The front arm has a horizontal slot, $e$, and a pivot-bolt, $f$, fixed in the frame occupies the slot. A spiral spring, $o$, is interposed between the bent end $o'$ of the front arm and the pivot-bolt. Thus the draft-strain of the harrow comes on the spring and compresses it. A base-plate, $o^2$, serves for one end of the spring $o$ to bear against, and the bolt $o^3$, attached to it, passes endwise through the spiral spring and loosely through the said bent end $o'$. It will thus be seen the harrow is pivoted at front, and is adapted to yield or give back in case one of the teeth $h\ i$ comes in contact with an unyielding object in the ground. The rear arm, $F^2$, occupies loosely a keeper, $g$, on the side of the frame, and thereby the rear part of the harrow is free to be raised or lowered. An arm, H, is rigidly secured on the harrow cross-beams, and inclines up and rearward and over the rear beam of the draft-frame B. The driver may place his foot on the rigid arm H, and by bearing down on it press the teeth of the harrow in the ground. A lever, I, is pivoted to the draft-frame, and its rear end has a foot-rest for the driver's foot. A chain, $r$, connects its front end to the harrow. By bearing down on the foot-rest of the lever, the entire harrow-frame may be elevated from the ground.

The features of the harrow are not here separately claimed, but are set forth in my application for Letters Patent of the United States, Serial No. 229,541, filed March 3, 1887.

I may use revolving disk-cutters in the harrow instead of the prongs and teeth $h\ i$, or I may use the said revolving disk-cutters in addition to the prongs and teeth.

A conveyer to carry the grass-seed from the hopper A consists of an inclined apron, E', having corrugations $f'$ from top to bottom. This device allows of broadcast sowing and secures an even distribution of the seed and placing it on the ground exactly where it is wanted. This device is shown and described in my application for Letters Patent of the United States, Serial No. 232,952, filed March 30, 1887.

The machine-frame has a central bar, T, which serves as a draft-pole, and at the front a caster-wheel, of which the shank U' only is here shown.

The wheels C' may at any time be removed and a land-roller substituted therefor.

By the combined parts here shown provision is made in this one machine for breaking up the land, harrowing it into condition for planting, sowing grass-seed, and drilling grain and fertilizer, all at one operation, or by passing the machine over the ground once.

Having described my invention, I claim and desire to secure by Letters Patent of the United States—

1. The combination of the frame B, mounted on wheels or rollers, the plows D, pivoted to the lower side of the frame, a harrow attached to the frame, and a horizontal crosswise bar, J, capable of rising and lowering vertically, and having drill-tubes E attached, for the purpose set forth.

2. The combination of the frame B, mounted on wheels or rollers, the plows D, pivoted to the lower side of the frame and attached to chains or levers, by which they may be raised, a harrow pivoted to the frame, a vertical hanger and guide-arm, K, secured at opposite sides of the frame, and a horizontal crosswise bar, J, capable of rising and lowering vertically on said guide-arms, and having drill-tubes E attached, for the purpose set forth.

3. The combination of the frame B, mounted on wheels or rollers, hangers R, attached to the frame and provided at its lower part with a lug or brace-shoulder, $n$, plows, each provided with a standard, N, pivoted to the hanger, and having a forward-projecting arm, Q, a lifting-lever, $r'$, and a chain, $D^2$, connecting the forward-projecting arm with the lifting-lever, for the purpose set forth.

4. The combination of the frame B, mounted on wheels or rollers, hangers R, attached to the frame and provided with a set-screw, $l$, and a brace-shoulder, $n$, having teeth or serrations $n'$, and plows, each having a standard, N, provided with similar teeth and vertically adjustable on the said hanger, for the purpose set forth.

5. The combination of the frame B, mounted on wheels or rollers, the plows D, pivoted to the lower side of the frame, a harrow attached to the frame, a seed-hopper, A, and an inclined apron below the hopper, having corrugations from top to bottom, and a horizontal crosswise bar, J, capable of rising and lowering vertically, and having drill-tubes E attached, for the purpose set forth.

In testimony whereof I affix my signature in the presence of two witnesses.

THOMAS R. CRANE.

Witnesses:
JOHN E. MORRIS,
JNO. T. MADDOX.